(12) United States Patent
Kobayashi

(10) Patent No.: US 7,238,249 B2
(45) Date of Patent: Jul. 3, 2007

(54) PRODUCING METHOD OF HIGH SPEED FV REDUCING TIRE

(75) Inventor: Hiroyuki Kobayashi, Kobe (JP)

(73) Assignee: Sumitomo Rubber Industries, Ltd., Kobe-shi, Hyogo-ken (JP)

( * ) Notice: Subject to any disclaimer, the term of this patent is extended or adjusted under 35 U.S.C. 154(b) by 419 days.

(21) Appl. No.: 10/854,195

(22) Filed: May 27, 2004

(65) Prior Publication Data
US 2004/0238986 A1 Dec. 2, 2004

(30) Foreign Application Priority Data
May 29, 2003 (JP) .............................. 2003-153086

(51) Int. Cl.
*B29D 30/00* (2006.01)
(52) U.S. Cl. ................ 156/110.1; 156/123; 156/128.1; 264/40.1; 264/326; 702/41; 702/84
(58) Field of Classification Search ............ 156/110.1, 156/123, 128.1, 133, 134; 73/146; 702/41, 702/84; 264/40.1, 326
See application file for complete search history.

(56) References Cited

U.S. PATENT DOCUMENTS

| | | | | |
|---|---|---|---|---|
| 5,396,438 | A * | 3/1995 | Oblizajek | 702/84 |
| 6,514,441 | B1 * | 2/2003 | Tanaka et al. | 264/40.1 |
| 6,842,720 | B2 * | 1/2005 | Chang | 702/182 |
| 2002/0177964 | A1 * | 11/2002 | Shteinhauz | 702/75 |
| 2004/0020583 | A1 * | 2/2004 | Zhu et al. | 156/110.1 |
| 2006/0137802 | A1 * | 6/2006 | Flament et al. | 156/110.1 |

FOREIGN PATENT DOCUMENTS

| | | | |
|---|---|---|---|
| JP | 6-182903 | * | 7/1994 |
| JP | 11-352024 | A | 12/1999 |
| JP | 2001-141615 | A | 5/2001 |
| JP | 2002-103332 | * | 4/2002 |
| JP | 2004-142220 | * | 5/2004 |

OTHER PUBLICATIONS

Machine translation for Japan 2001-141615.*
Machine translation for Japan 11-352024.*

* cited by examiner

*Primary Examiner*—Steven D. Maki
(74) *Attorney, Agent, or Firm*—Birch, Stewart, Kolasch & Birch, LLP

(57) ABSTRACT

It is an object of the present invention to reduce a high speed FV n-order component of a completed tire by specifying a mounting phase of a raw tire with respect to a vulcanization mold. A variation amount of a total gage of a tread portion of each of non-vulcanized raw tires Pi (i=1 to m) each having a plurality of (k) tire constituent members including a joint portion whose one end and the other end in its circumferential direction are connected to each other, and a high speed FV of each of completed tires Qi (i=1 to m) obtained by vulcanizing and forming the raw tire Pi (i=1 to m) using a vulcanization mold are measured to obtain an estimation equation. Based on the equation, the mounting phase of the raw tire after the m-th can be specified.

7 Claims, 10 Drawing Sheets

PRODUCING METHOD OF HIGH SPEED FV REDUCING TIRE

BACKGROUND OF THE INVENTION

1. Field of the Invention

The present invention relates to a producing method of a high speed FV (force variation) reducing tire in which, for each of rn-number of raw tires in the same lot, a variation amount of a total gage of a tread portion and high speed FV in a completed tire formed by vulcanization-forming the raw tires are measured to obtain a predetermined estimation equation, mounting phases of raw tires after the m-th tire with respect to the vulcanization mold are specified based on the estimation equation, and thereby an n-order component of high speed FV of the completed tires after the m-th tire is reduced.

2. Prior Art

In order to improve vehicle vibration resulting from a tire, it is necessary to reduce a vibration force generated by the tire, and a 100% inspection of low speed uniformity is conventionally carried out in many cases when the tires are produced. A measuring method of the low speed uniformity is laid down in JASOC607-87. According to this method, uniformity factors such as a radial FV, a tangential FV, a lateral FV, and a radial runout (RRO) are measured at low rotation speed of 60 rmp or lower.

In recent years, it has been found that a higher-order component of the high speed uniformity is strongly involved in vibration and noise caused by running at high speed. Therefore, the desire to provide tires having excellent high speed uniformity grows in the tire market. However, since it is necessary to measure the high speed uniformity at high speed rotation using a special uniformity machine, it takes a long time for carrying out the measurement, and it is extremely difficult to carry out the 100% inspection.

Thereupon, in recent years, it has been proposed to estimate the higher-order component of the high speed uniformity of a tire using a regression equation or a statistical processing from a uniformity factor of the low speed uniformity.

FIG. 10(A) shows a relation between high speed radial FV2-order and low speed radial FV2-order. FIG. 10(B) shows a relation between the high speed radial FV2-order and RRO2-order. As shown in these drawings, since the tire uniformities have different mechanisms depending upon speed, a correlation between the low speed uniformity and the high speed uniformity is not high and thus, it is difficult to sufficiently enhance the estimation precision of the higher-order component of the high speed uniformity. In the conventional technique, it is only possible to discriminate a completed tire based on the estimation, and it is not possible to positively produce a tire having excellent high speed uniformity.

In view of such circumstances, the present inventor researched and found the following fact. That is, in the same lot, there were high correlations between magnitude and phase of an n-order component of a total gage distribution of a tread portion in a raw tire, between magnitude and phase of variation of local total gage at a joint position of various tire constituent members in the raw tire (e.g., inner liner rubber, tread rubber, carcass ply, belt ply and the like) in a circumferential direction of each tire, and between magnitude and phase of the high speed FV n-order component in the completed tire obtained by vulcanization-forming the raw tire. Based on the information, the estimation equation was obtained from a leading sample of the same lot, thereby making it possible to precisely estimate, for the tires after the sampled tire, the n-order component of high speed FV when this raw tire became the completed tire in a state in which the tire remained as the raw tire. For the tires after the sampled tire, if the mounting phase of the raw tire to the vulcanization mold was specified based on this estimation, the n-order component of high speed FV of the completed tire could be reduced.

SUMMARY OF THE INVENTION

That is, it is an object of the present invention to provide a producing method of a high speed FV reducing tire in which in a raw tire state, an n-order component of high speed FV of a completed tire when this raw tire is vulcanization-formed can be estimated precisely, and by specifying the mounting phase of the raw tire to the vulcanization mold based on this estimation, the n-order component of high speed FV when the raw tire becomes a completed tire can be reduced.

To achieve the above object, the invention of the present application provides a producing method of a high speed FV reducing tire in which a variation amount of a total gage of a tread portion of each of non-vulcanized raw tires $P_i$ ($i=1$ to m) each having a plurality of(k) tire constituent members including a joint portion whose one end and the other end in its circumferential direction are connected to each other, and a high speed FV of each of completed tires $Q_i$ ($i=1$ to m) obtained by vulcanizing and forming the raw tire $P_i$ ($i=1$ to m) using a vulcanization mold are measured to obtain an estimation equation, and an n-order component of high speed FV of completed tires after m-th completed tire is reduced by specifying a mounting phase of each of raw tires after m-th raw tire with respect to the vulcanization mold based on the estimation equation, wherein the method comprises:

1) a step of measuring a total gage of a tread portion of each of ten or more raw tires $P_i$ ($i=1$ to m) in the same lot, thereby obtaining a joint variation vector ($\rightarrow J_{ij}$) comprising a local joint variation amount $J_{ij}$ ($i=1$ to m and $j=1$ to k) of the total gage in the joint portion ($j=1$ to k) of each of the tire constituent members and a phase $\theta_{ij}$ of each joint positions from a raw tire reference position X1, 2) a step of measuring the total gage of the tread portion of each of the raw tires $P_i$ ($i=1$ to m), performing order-analysis on a distribution of the variation amount of the total gage over one circuit of the tire while using the raw tire reference position X1 as the reference, and obtaining a total gage n-order component vector ($\rightarrow V_{in}$), 3) a step of measuring the high speed FV of each of the completed tires $Q_i$ ($i=1$ to m), performing order-analysis on a distribution of the variation amount of the high speed FV over one circuit of the tire while using the raw tire reference position X1 as the reference, and obtaining a high speed FV n-order component vector ($\rightarrow QFV_{in}$), 4) a step of obtaining a mold n-order component vector ($\rightarrow MFV_n$) of high speed FV generated due to the vulcanization mold using the high speed FV n-order component vector ($\rightarrow QFV_{in}$) of each the completed tire $Q_i$, 5) a step of subtracting the high speed FV mold n-order component vector ($\rightarrow MFV_n$) from the high speed FV n-order component vector ($\rightarrow QFV_{in}$) of each the completed tire $Q_i$, thereby obtaining a high speed FV n-order component vector (→PFVin) of the raw tire Pi corresponding to each the completed tire Qi using the following equation 1):

$$(\rightarrow PFVin) = (\rightarrow QFVin) - (\rightarrow MFVn) \quad (1)$$

6) a step of obtaining transfer functions →An, →Bnj (j=1 to k) in the following multiple regression estimation equation 2) by least squares method using the vectors (→QFVin), (→MFVn), (→Vin) and (→Jij) of the m-number tires obtained in steps 1) to 4), thereby completing the estimation equation 2), $$(\rightarrow PFVin) = (\rightarrow An) \cdot (\rightarrow Vin) + \sum_{j=1}^{k} \{(\rightarrow Bnj) \cdot (\rightarrow Jij)\}$$

7) a step of obtaining the joint variation vector (→Jij) and the total gage n-order component vector (→Vin) of each of raw tire Pi (i>m) after the m-th raw tire, and, by substituting the same into the estimation equation 2), estimating the high speed FV n-order component vector (→PFVin) of each of the raw tires Pi (i>m) after the m-th raw tire, and 8) a step of mounting each of the raw tires Pi (i>m) after the m-th raw tire to a vulcanization mold at a relative phase α of a mold reference position X2 with respect to the raw tire reference position X1 where a sum of the estimated high speed FV n-order component vector (→PFVin) and the high speed FV mold n-order component vector (→MFVn) becomes minimum.

DETAILED DESCRIPTION OF THE PREFERRED EMBODIMENTS

An embodiment of the present invention will be explained with reference to the drawings.

Figure 1:
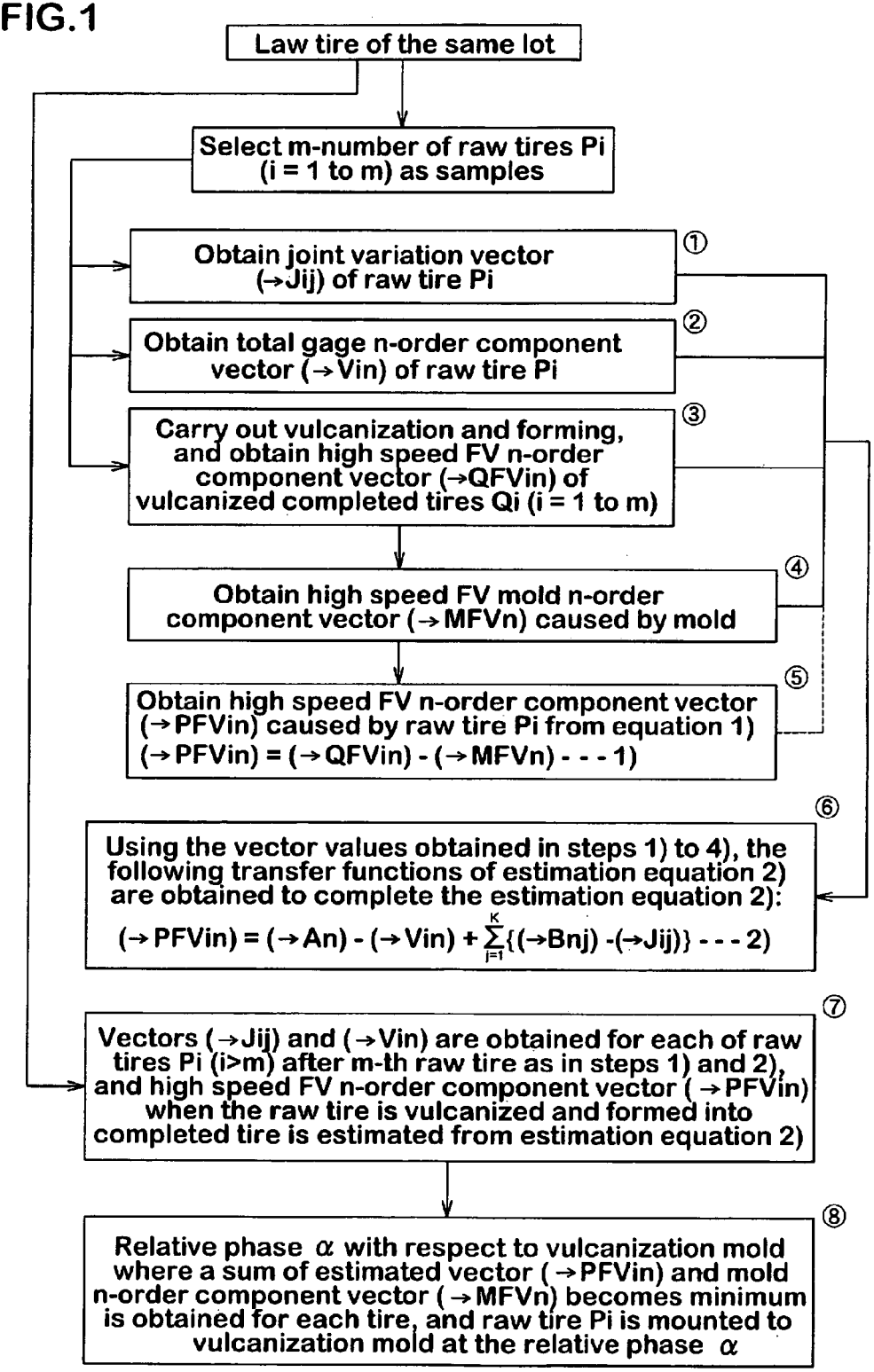
FIG. 1 is a flowchart showing a producing method of a high speed FV reducing tire of the present invention.

FIG. 1 is a flowchart showing a producing method of a high speed FV reducing tire (producing method of a tire, hereinafter) according to the present invention.

As shown in FIG. 1, the producing method of a tire according to this embodiment comprises:

1) a step of obtaining a joint variation vector (→Jij) of each of m-number of raw tires Pi (i=1 to m) in the same lot;

2) a step of obtaining a total gage n-order component vector (→Vin) of each of the raw tires Pi (i=1 to m);

3) a step of obtaining a high speed FV n-order component vector (→QFVin) of each of completed tires Qi (i=1 to m) obtained by vulcanization-forming each the raw tire Pi(i=1 to m);

4) a step of obtaining a mold n-order component vector (→MFVn) of the high speed FV caused by the vulcanization mold using the high speed FV n-order component vector (→QFVin);

5) a step of obtaining a high speed FV n-order component vector (→PFVin) of the raw tire Pi corresponding to each the completed tire Qi using the following equation 1):

$$(\rightarrow PFVin) = (\rightarrow QFVin) - (\rightarrow MFVn) \quad (1)$$

6) a step of obtaining a transfer function →An, →Bnj (j=1 to k) by least squares method using the vectors (→QFVin), (→MFVn), (→Vin), (→Jij) of the m-number tires obtained in steps 1) to 4) in the following equation 2), thereby completing the estimation equation 2);

$$(\rightarrow PFVin) = (\rightarrow An) \cdot (\rightarrow Vin) + \sum_{j=1}^{k} \{(\rightarrow Bnj) \cdot (\rightarrow Jij)\}$$

7) a step of estimating a high speed FV n-order component vector (→PFVin) of raw tires Pi after the m-th tire (i>m) using the estimation equation 2); and 8) a step of mounting, to the vulcanization mold, the raw tires Pi (i>m) after the m-th raw tire at a relative phase a with respect to the vulcanization mold at which a sum of the estimated high speed FV n-order component vector (→PFVin) and the mold n-order component vector (→MFVn) of the high speed FV become minimum.

With this method, the n-order component of high speed FV of completed tires after the m-th tire is reduced.

Figure 2:
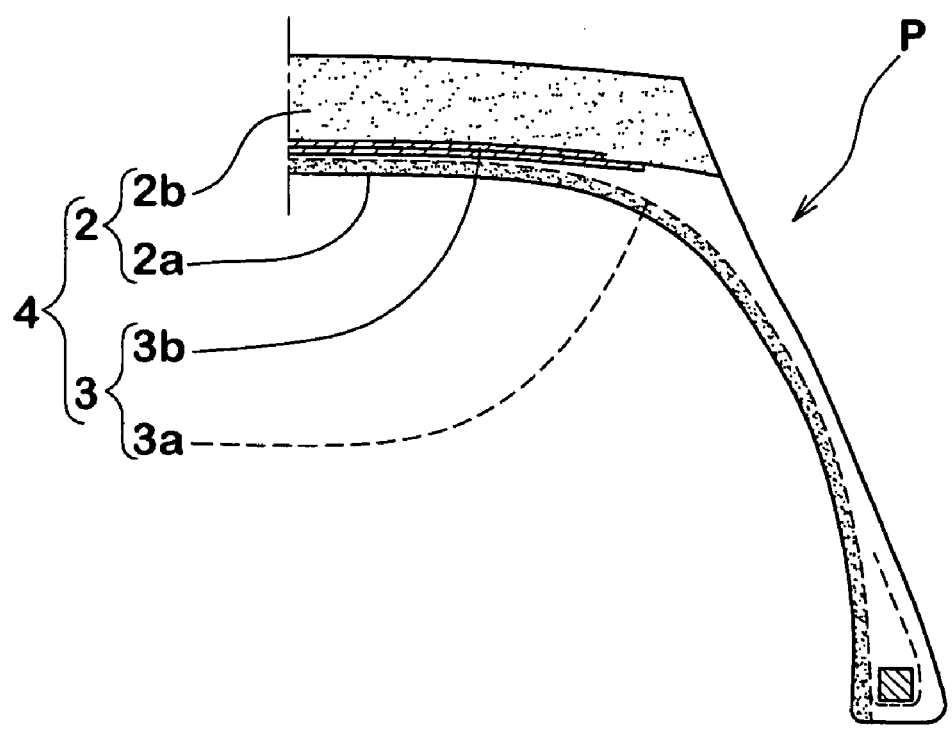
FIG. 2 is a meridional sectional view of one example of a raw tire.
Figure 3:
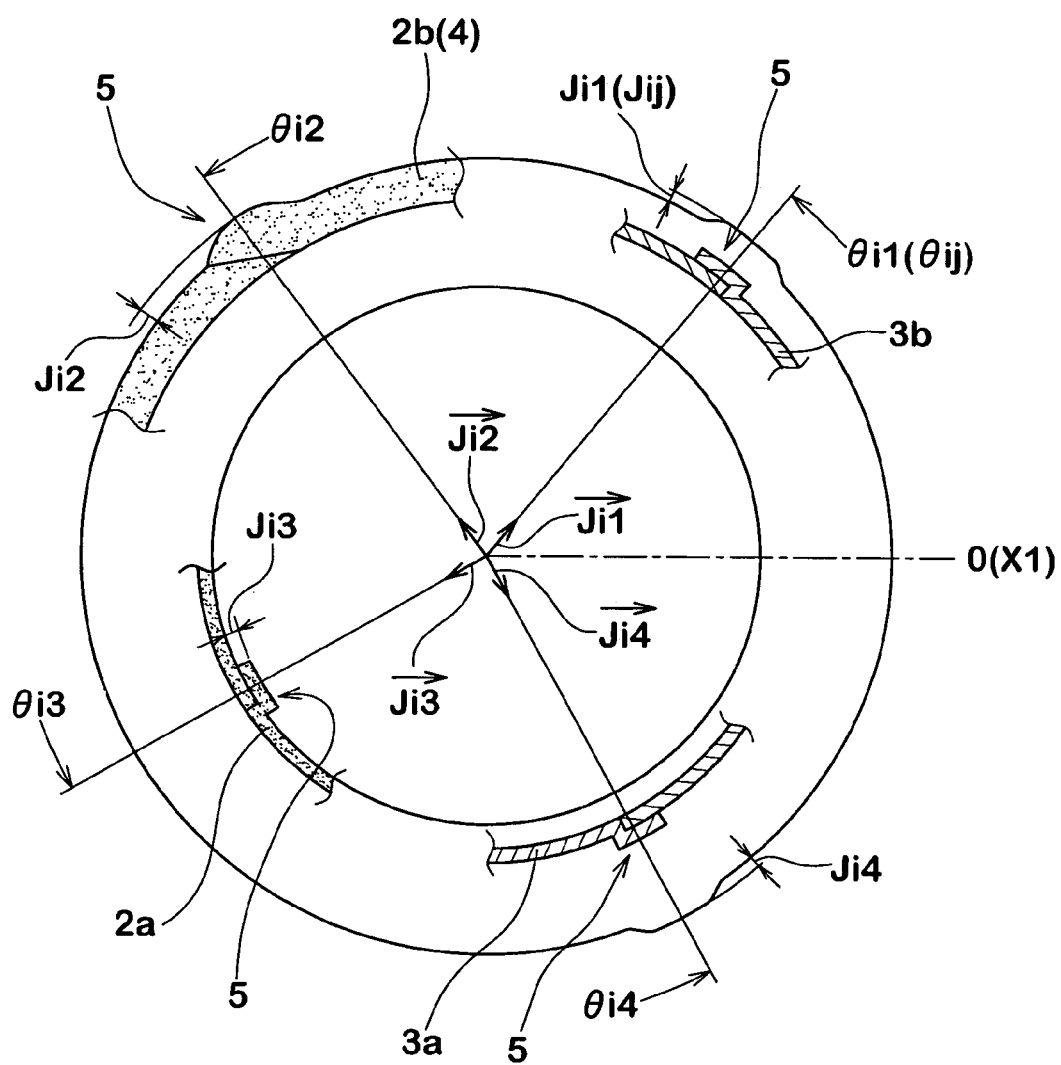
FIG. 3 is a sectional view of a tread portion in a circumferential direction of the tire in which joint portions of tire constituent members are emphasized.

As shown in FIG. 2, the raw tire P of this embodiment comprises a plurality of (k-number of) known tire constituent members 4 having a rubber member 2 including an inner liner rubber 2a, a tread rubber 2b, a cord ply member 3 including a carcass ply 3a and a belt ply 3b. FIG. 3 is an enlarged sectional view of the tread portion taken along a circumferential direction thereof. As shown in FIG. 3, one ends and the other ends of the tire constituent members 4 in their circumferential direction are butted against each other or superposed on each other and connected together to form joint portions 5. Thus, in the joint portion 5, a joint variation amount Jij (i=1 to m, j=1 to k) which is a local variation amount is included in the total gage of the tread portion.

In step 1), m-number of (ten or more) raw tires Pi (i=1 to m) in the same lot are selected as samples, and a total gage of the tread portions is measured. For each of the selected raw tires Pi (i=1 to m), joint variation vectors (→Jij) comprising the joint variation amount Jij (i=1 to m, j=1 to k) and a phase θij of each joint position from a raw tire reference position X1 are obtained.

The total gage can be measured by measuring displacement of an inner and outer surfaces of the tread portion in its thickness direction over one circuit of the tire using a gage such as a laser displacement gage. The raw tire reference position X1 is not especially limited, and any position can be set as the raw tire reference position X1. In order to enhance the estimation precision, it is preferable that the number of selected samples, i.e., the number of the samples m is 30 to more.

Figure 4A:
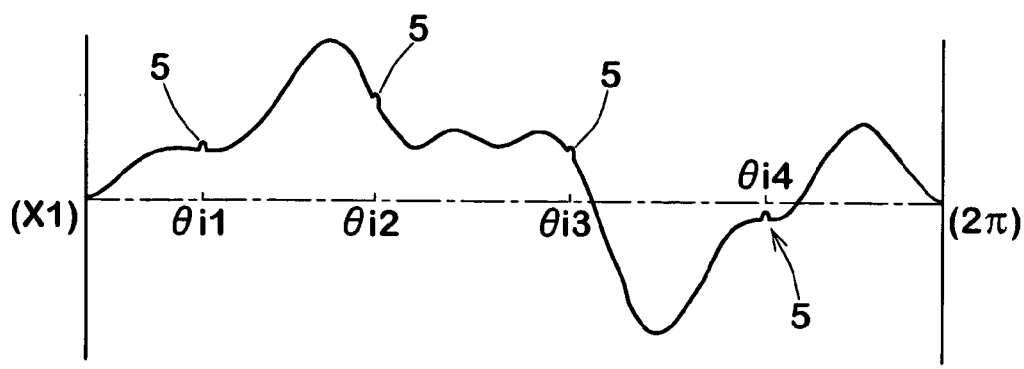
FIG. 4(A) is a diagram showing a distribution of a variation amount of a total gage of the tread portion over one circuit of the tire.
Figure 4B:
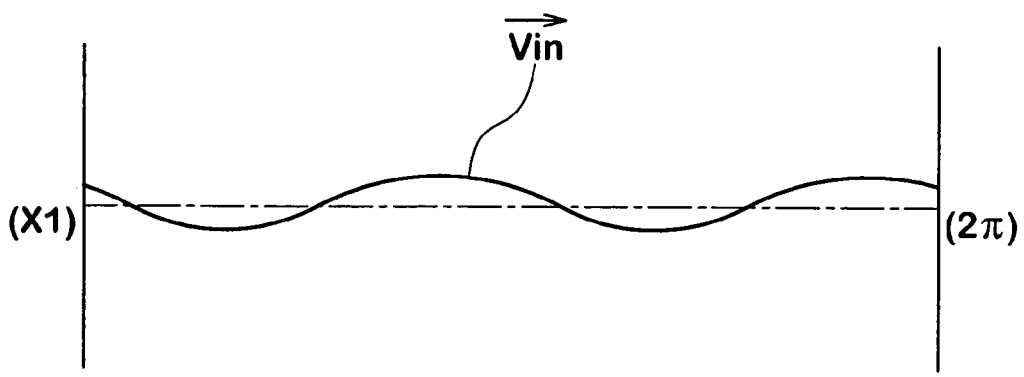
FIG. 4(B) is a diagram showing a total gage n-order component vector (→Vin) which performs order-analysis on the distribution.

In next step 2), the total gage of the tread portion of each raw tire Pi (i=1 to m) of the sample is measured, distribution of the variation amount over one circuit of the tire of the total gage is obtained while using the raw tire reference position X1 as a reference as shown in FIGS. 4(A) and 4(B), the distribution is further performed order-analysis, and a total gage n-order component vector (→Vin) which is the n-order component is obtained. FIG. 4(B) shows a 2-order component vector (→Vi2) in which n is 2. The distribution of the variation amount can be obtained when the total gage in step 1) is measured.

Figure 5A:
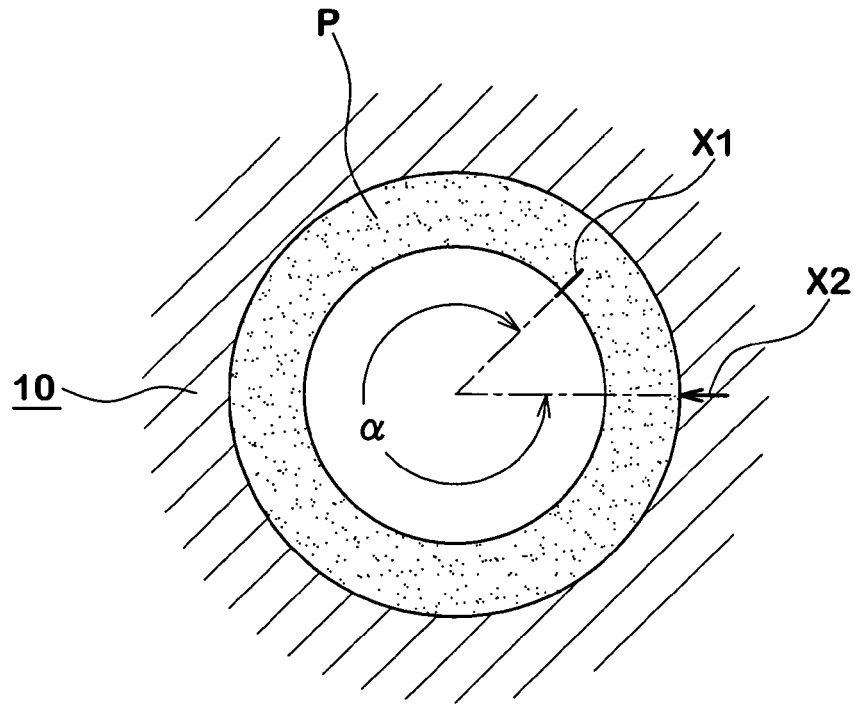
FIG. 5(A) is a diagram for explaining amounting operation of a raw tire to a vulcanization mold.
Figure 5B:
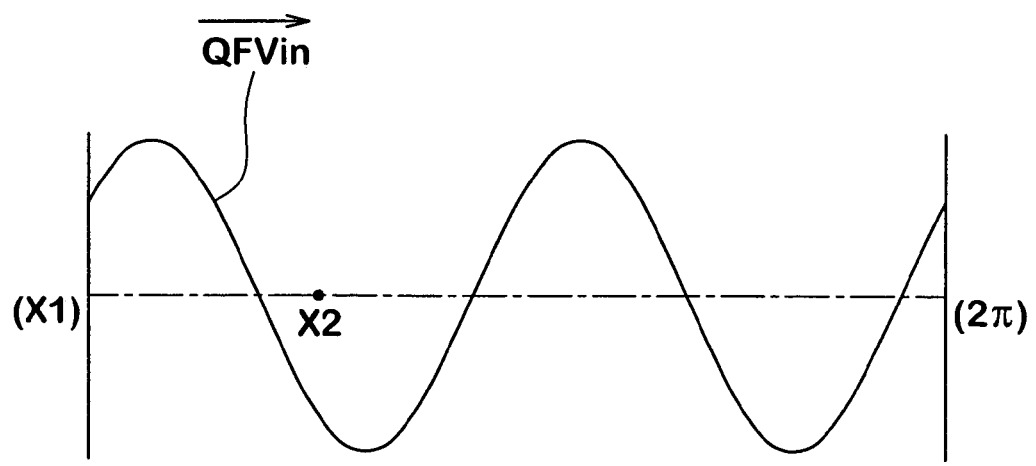
FIG. 5(B) is a diagram showing a high speed FV n-order component vector (→QFVin) of a completed tire.

In next step 3), as shown in FIG. 5(A), each raw tire Pi (i=1 to m) of the sample is vulcanization-formed using a vulcanization mold 10, thereby forming a completed tire Qi (i=1 to m) of the sample. Then, the high speed uniformity is measured with respect to each completed tire Qi of this sample, a waveform of the high speed FV obtained by this measurement is performed order-analysis, thereby obtaining its n-order component vector (→QFVin) as shown in FIG. 5(B), while using the raw tire reference position X1 as the reference.

At that time, it is necessary that the raw tire reference position X1 and a mold reference position X2 of the vulcanization mold 10 can be recognized in the completed tire Qi. For this purpose, it is preferable that the raw tire Pi and the vulcanization mold 10 are provided with marks capable of displaying the reference positions X1 and X2. The mold reference position X2 is not especially limited, and any position can be set as the mold reference position X2. In this embodiment, the mold reference position X2 is at a position where an inscription-like stencil inscribing a tire with information such as model number and a production date is added In next step 4), a mold n-order component vector (→MFVn) which is n-order component of the high speed FV generated because of the vulcanization mold 10 is obtained.

Here, the main reason why the high speed FV of the completed tire Qi is generated are a raw tire factor caused by non-uniformity generated when various tire constituent members 4 are pasted on one another to form the raw tire Pi, and a mold factor caused by non-uniformity generated by the vulcanization mold itself or when the vulcanization mold is assembled. In this specification, of the high speeds FV of the completed tire Qi, a high speed FV generated by the raw tire factor is called a high speed FV of a raw tire, and an n-order component obtained by performing order-analysis on this high speed FV of the raw tire is called high speed FV n-order component vector (→PFVin) of the raw tire Pi. Further, of the high speeds FV of the completed tire Qi, a high speed FV caused by the mold factor is called a high speed FV of the mold, and an n-order component obtained by performing order-analysis on this high speed FV of the mold is called a mold n-order component vector (→MFVn)

Figure 6:
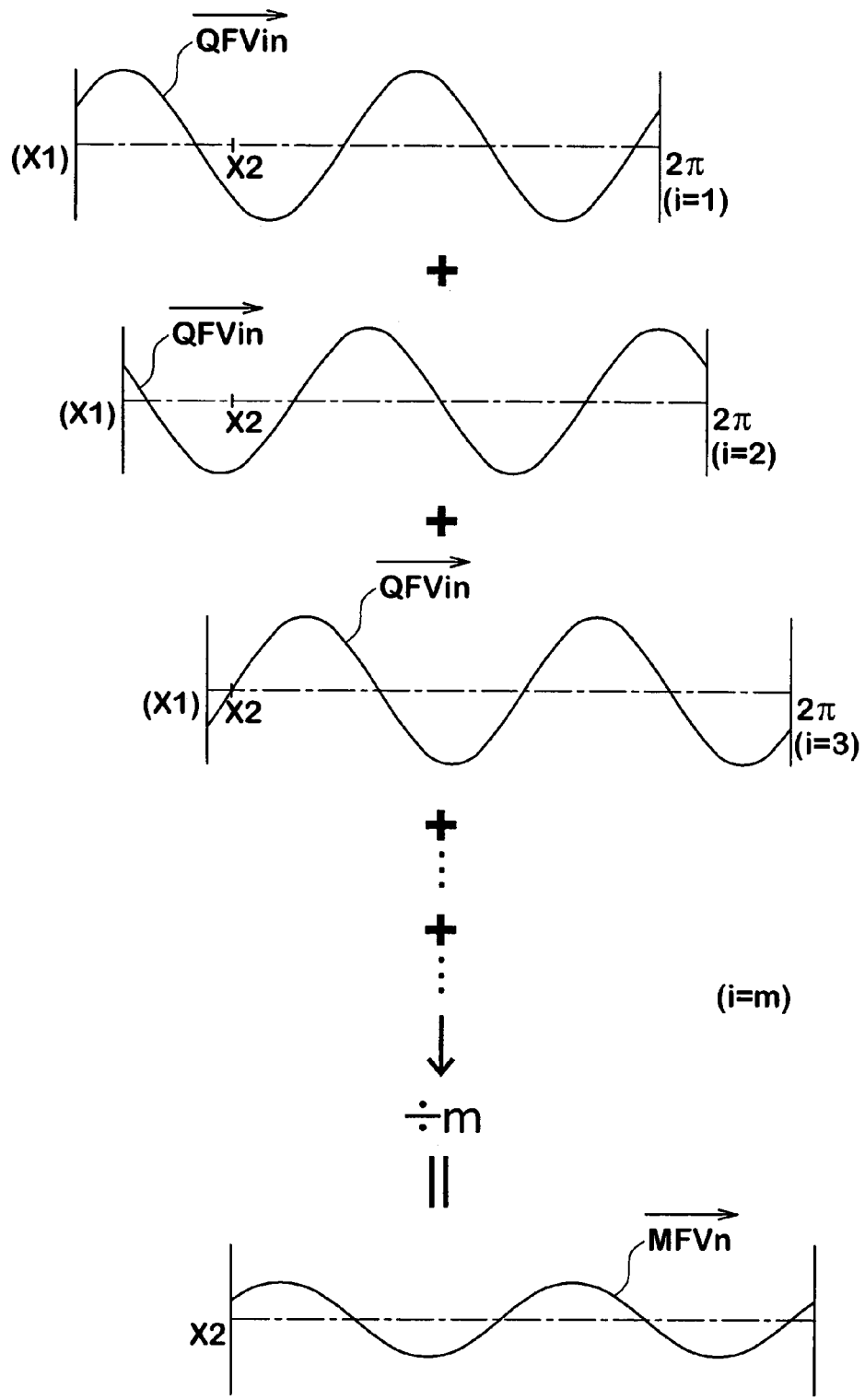
FIG. 6 is a diagram for explaining step 4)

The mold n-order component vector (→MFVn) is obtained using the high speed FV n-order component vector (→QFVin) obtained in step 3). More specifically, as shown in FIG. 6, the m-number high speed FV n-order component vectors (→QFVin) obtained in step 3) are superposed on one another using the mold reference position X2 as a reference and they are averaged, and thereby the mold n-order component vector (→MFVn) is obtained. With this, influence on the high speed FV n-order component other than the vulcanization mold is compensated, and the mold n-order component vector (→MFVn) caused by the mold factor can be obtained.

At that time, in order to precisely compensate the influence other than the vulcanization mold 10, it is preferable that the joint portions 5 are disposed at random with respect to the mold reference position X2 to form a raw tire Pi of the sample, or the joint portions 5 are regularly disposed by the superposing at positions where the joint portions 5 are compensated to form a raw tire Pi of the sample.

Figure 7:
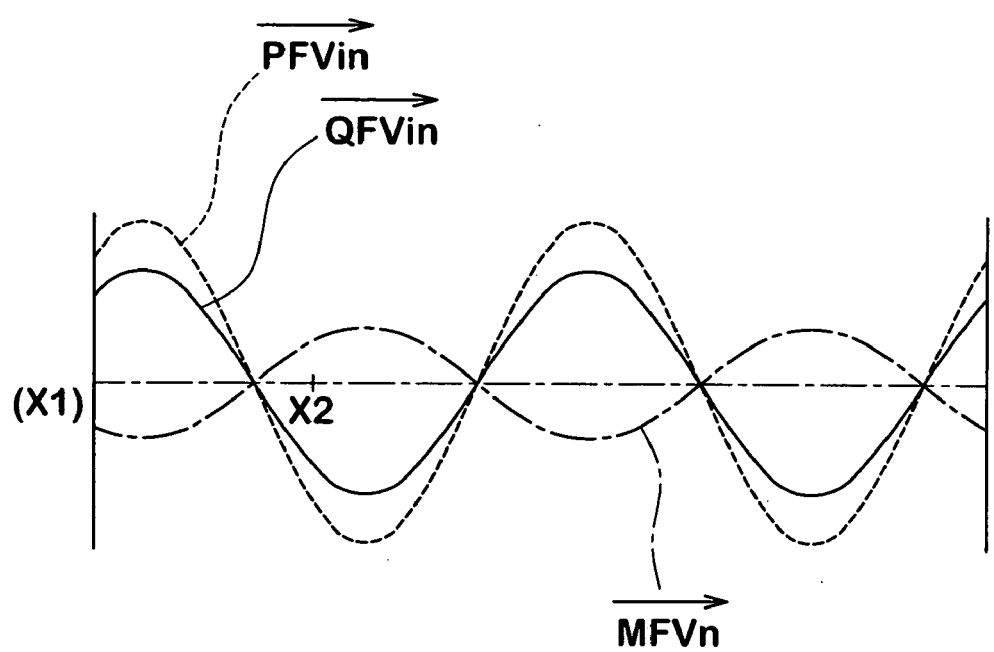
FIG. 7 is a diagram for explaining step 5)

In next step 5), as shown in FIG. 7, the mold n-order component vector (→MFVn) obtained in step 4) is subtracted from the high speed FV n-order component vector (→QFVin) of each completed tire Qi obtained in step 3), thereby obtaining the high speed FV n-order component vector (→PFVin) using the raw tire Pi corresponding to the completed tire Qi as a factor by the following equation 1). At that time, as shown in FIG. 7, positioning of the mold reference position X2 of the vector (→QFVin) and the mold reference position X2 of the vector (→MFVn) are carried out to perform the calculation.

$$(\rightarrow PFVin) = (\rightarrow QFVin) - (\rightarrow MFVn) \qquad (1)$$

In next step 6), the following multiple regression equation 2) is defined as an estimation equation of the high speed FV n-order component vector (→PFVin). Transfer functions →An, →Bnj (j=1 to k) in the estimation equation 2) are obtained by the least squares method using the vectors (→QFVin), (→MFVn), (→Vin), (→Jij) of the m-number tires obtained in steps 1) to 4), thereby completing the estimation equation 2).

$$(\rightarrow PFVin) = (\rightarrow An)\cdot(\rightarrow Vin) + \sum_{j=1}^{k}\{(\rightarrow Bnj)\cdot(\rightarrow Jij)\}$$

At that time, in the estimation equation 2), it is necessary that a dimension of phases of the vectors (→PFVin) and (→Vin), and a dimension of a phase θij of the vector (→Jij) match each other. For this purpose, the calculation is performed by replacing the phase θij by a conversion phase θ'ij (=n×θij) which is n-times of the phase θij.

In next step 7), the total gage of the tread portion of each of the raw tires Pi (i>m) after the m-th non-sample raw tire is measured, and the joint variation vector (→Jij) and the total gage n-order component vector (→Vin) are obtained like in steps 1) and 2). By substituting the vectors (→Jij) and (→Vin) into the estimation equation 2) and performing the calculation, the high speed FV n-order component vector (→PFVin) is estimated for each of the raw tire Pi (i>m) of the non-sample. In this calculation, in order to match the dimensions of the phases of the vector (→Jij) and vector (→Vin) each other, the calculation is performed while replacing the phase θij by the conversion phase θ'ij (=n×θij).

Figure 8:
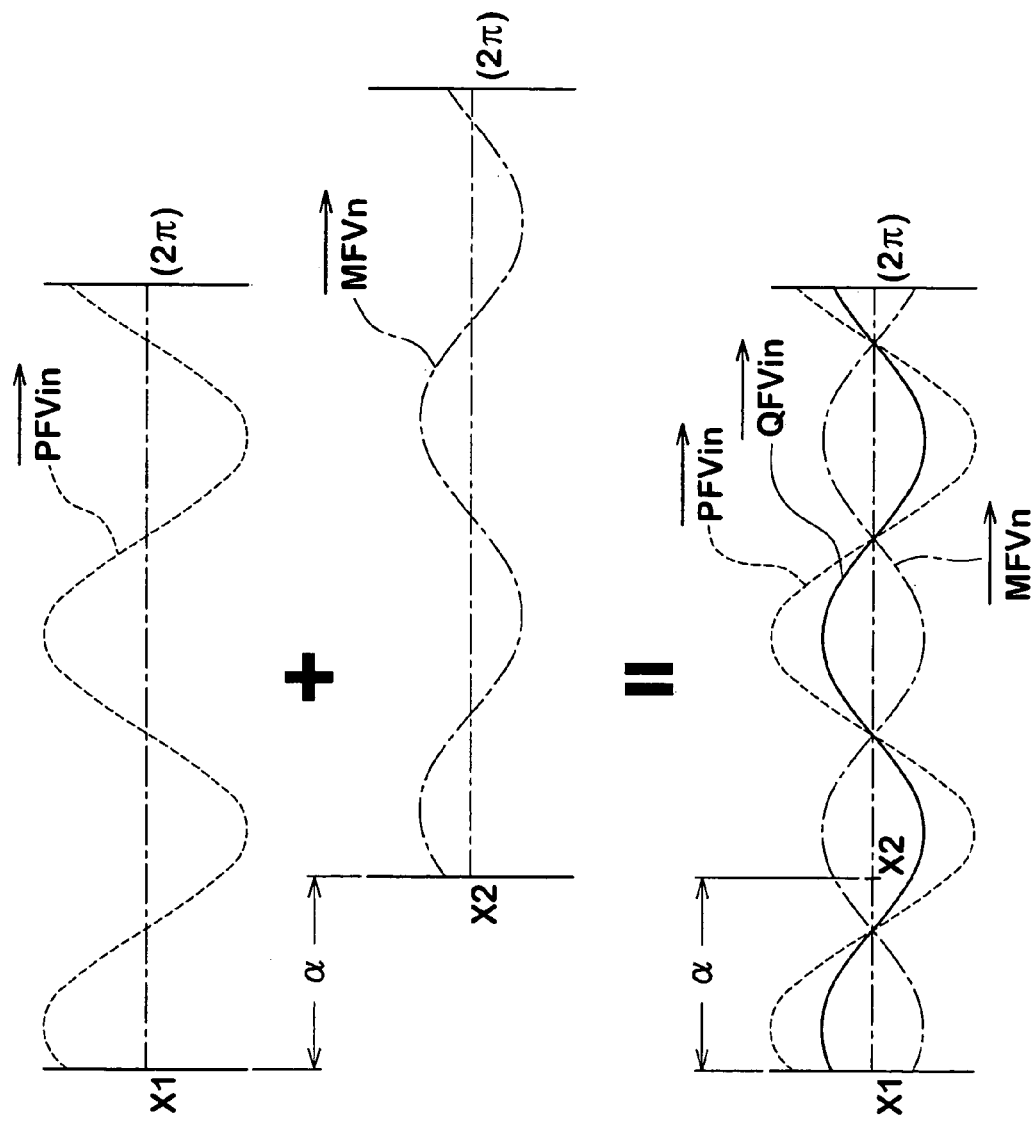
FIG. 8 is a diagram for explaining step 8)

In step 8), as shown in FIG. 8, for each the raw tire Pi of the non-sample, a relative phase α of the mold reference position X2 with respect to the raw tire reference position X1, where a sum of the high speed FV n-order component vector (→PFVin) of the raw tire Pi of the non-sample estimated in step 7) and the mold n-order component vector (→MFVn) obtained in step 4) becomes minimum, is obtained. By mounting the raw tires Pi of the non-sample to the vulcanization mold 10 based on the relative phase α, it is possible to reduce the n-order component of high speed FV of the completed tires after the m-th tire.

According to this invention, it is possible to reduce appropriate order component of 1-order or higher in a high speed FV such as a high speed radial FV, a high speed tangential FV, a high speed lateral FV. The present invention can preferably be carried out for reducing 2-order to 5-order high speed FV component which highly contributes to vibration caused when high speed running, especially the high speed radial FV 4-order component or the high speed tangential FV 2-order component at which resonance of the tire is prone to be generated.

Although the preferable embodiment of the present invention has been described above in detail, the invention is not limited to the embodiment, and various modifications can be made.

EMBODIMENT

Figure 9:
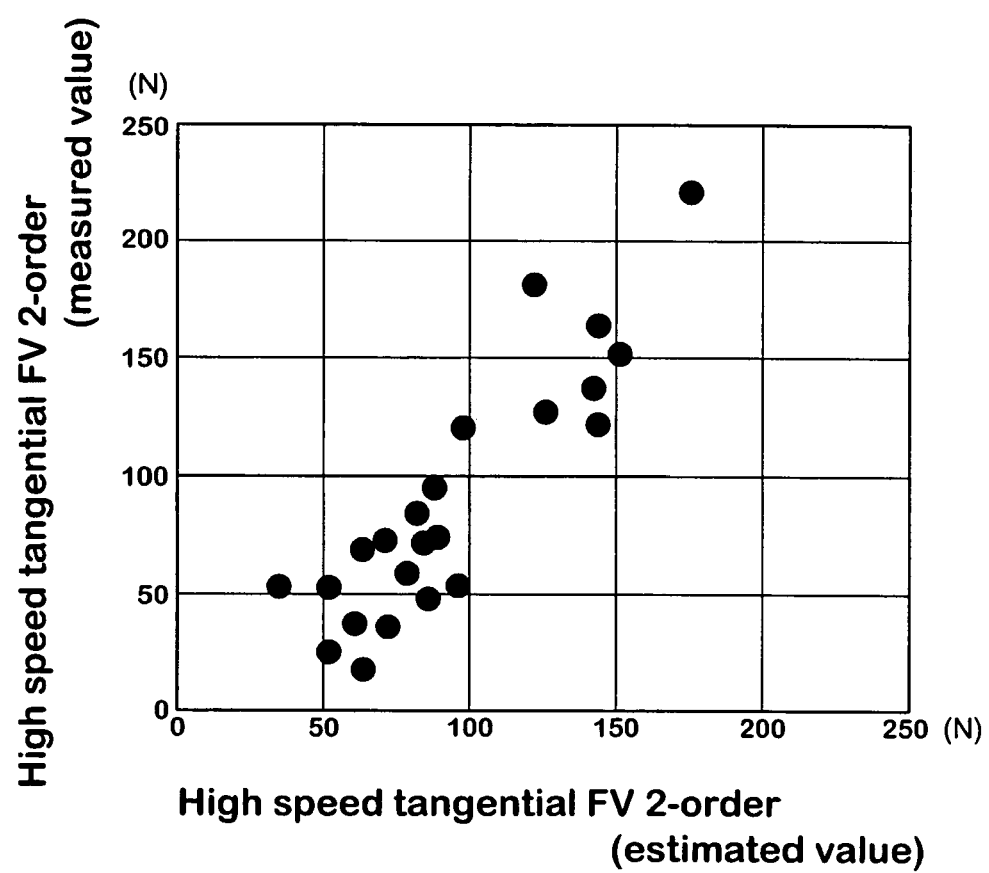
FIG. 9 is a diagram in which an estimated value of a high speed tangential FV 2-order component from a raw tire and an actually measured value obtained from a completed tire.
Figure 10A:
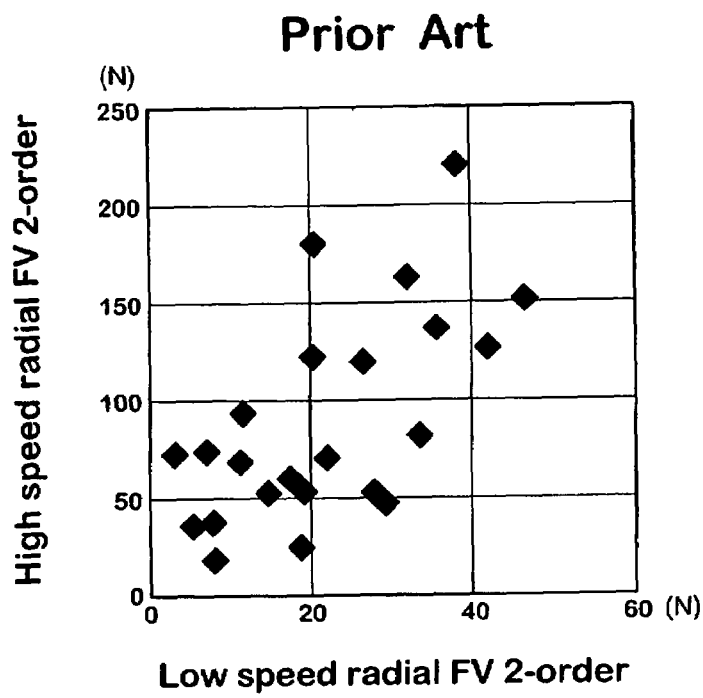
FIG. 10(A) is a diagram showing a relation between a high speed radial FV2-order and a low speed radial FV2-order.
Figure 10B:
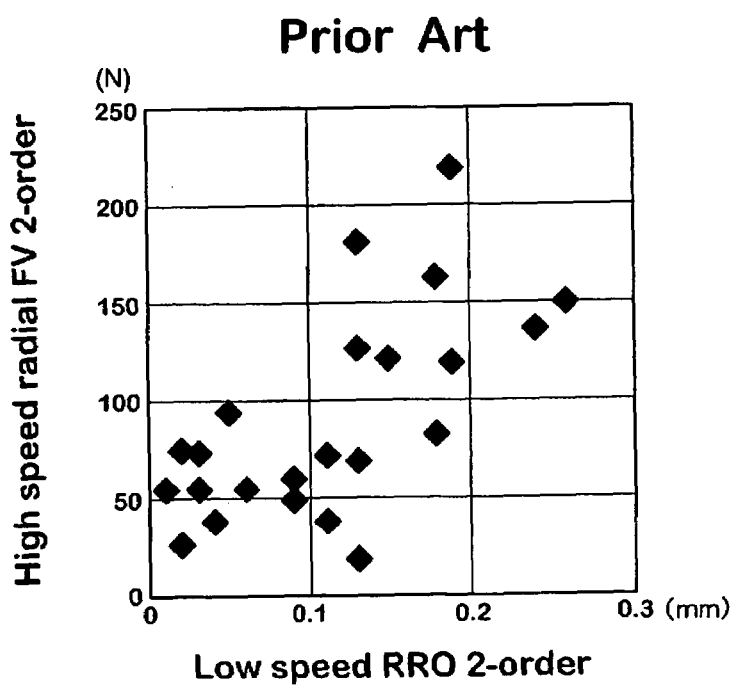
FIG. 10(B) is a diagram showing a relation between high speed radial FV2-order and RRO2-order.

Using steps 1) to 7) of the present invention, a value of a high speed tangential FV 2-order component after vulcanization was estimated from a non-vulcanized raw tire. This raw tire was actually vulcanized and formed to form a completed tire. A value of the high speed tangential FV 2-order component of this completed tire was compared with the estimated value. A result thereof is shown in FIG. 9. As shown in FIG. 9, it can be found that a high speed FV n-order component after vulcanization can be estimated with high precision from a raw tire. If a mounting phase of the raw tire with respect to the vulcanization mold is specified based on this estimated value, it is possible to reduce the high speed FV n-order component of the completed tire.

Since the present invention has the above-described configuration, it is possible to estimate a high speed FV n-order component of a completed tire when the completed tire is formed of the raw tire by vulcanization forming from a raw tire with high precision, and a high speed FV n-order component when the raw tire becomes the completed tire can be reduced by specifying the mounting phase of the raw tire with respect to the vulcanization mold based on the estimation.

What is claimed is:

1. A producing method of a high speed FV reducing tire in which a variation amount of a total gage of a tread portion of each of non-vulcanized raw tires Pi (i=1 to m) each having a plurality of(k) tire constituent members including a joint portion whose one end and the other end in its circumferential direction are connected to each other, and a high speed FV of each of completed tires Qi (i=1 to m) obtained by vulcanizing and forming the raw tire Pi (i=1 to m) using a vulcanization mold are measured to obtain an estimation equation, and an n-order component of high speed FV of completed tires after m-th completed tire is reduced by specifying a mounting phase of each of raw tires after m-th raw tire with respect to the vulcanization mold based on the estimation equation, wherein the method comprises:

1) a step of measuring a total gage of a tread portion of each of a number m of the raw tires Pi (i=1 to m), where m is ten or more in the same lot, and using said measured total gage to obtain a joint variation vector ($\rightarrow$Jij) comprising a local joint variation amount Jij (i=1 to m and j=1 to k) of the total gage in the joint portion (j=1 to k) of each of the tire constituent members and a phase $\theta$ij of each joint positions from a raw tire reference position X1, 2) a step of obtaining a distribution of the variation amount of said measured total gage over one circuit of the tire while using the raw tire reference position X1 as the reference, and obtaining a total gage n-order component vector ($\rightarrow$Vin) by performing order-analysis on said distribution of the variation amount of the total gage, 3) a step of measuring the high speed FV of each of the completed tires Qi(i=1 to m), performing order-analysis on a distribution of the variation amount of the high speed FV over one circuit of the tire while using the raw tire reference position X1 as the reference, and obtaining a high speed FV n-order component vector ($\rightarrow$QFVin), 4) a step of obtaining a mold n-order component vector ($\rightarrow$MFVn) of high speed FV generated due to the vulcanization mold using the high speed FV n-order component vector ($\rightarrow$QFVin) of each the completed tire Qi, 5) a step of subtracting the high speed FV mold n-order component vector ($\rightarrow$MFVn) from the high speed FV n-order component vector ($\rightarrow$QFVin) of each the completed tire Qi, thereby obtaining a high speed FV n-order component vector ($\rightarrow$PFVin) of the raw tire Pi corresponding to each the completed tire Qi using the following equation 1):

$$(\rightarrow PFVin) = (\rightarrow QFVin) - (MFVn) \quad (1)$$

6) a step of obtaining transfer functions $\rightarrow$An, $\rightarrow$Bnj (j=1 to k) in the following multiple regression estimation equation 2) by least squares method using the vectors ($\rightarrow$QFVin), ($\rightarrow$MFVn), ($\rightarrow$Vin) and ($\rightarrow$Jij) of the in-number tires obtained in steps 1) to 4), thereby completing the estimation equation 2), $$(\rightarrow PFVin) = (\rightarrow An)\cdot(\rightarrow Vin) + \sum_{j=1}^{k}\{(\rightarrow Bnj)\cdot(\rightarrow Jij)\} \quad (2)$$

7) a step of obtaining the joint variation vector ($\rightarrow$Jij) and the total gage n-order component vector ($\rightarrow$Vin) of each of raw tire Pi (i>m) after the m-th raw tire, and, by substituting the same into the estimation equation 2), estimating the high speed FV n-order component vector ($\rightarrow$PFVin) of each of the raw tires Pi (i>m) after the m-th raw tire, and 8) a step of mounting each of the raw tires Pi (i>m) after the m-th raw tire to a vulcanization mold at a relative phase $\alpha$ of a mold reference position X2 with respect to the raw tire reference position X1 where a sum of the estimated high speed FV n-order component vector ($\rightarrow$PFVin) and the high speed FV mold n-order component vector ($\rightarrow$MFVn) becomes minimum.

2. The producing method of a high speed FV reducing tire according to claim 1, wherein the mold n-order component vector ($\rightarrow$MFVn) is obtained by superposing the high speed FV n-order component vectors ($\rightarrow$QFVin) of the in-number completed tires Qi on one another while using the mold reference position X2 as a reference and averaging the same, and compensating influence on the high speed FV excepting influence on the high speed FV of the vulcanization mold.

3. The producing method of a high speed FV reducing tire according to claim 1, wherein the n-order component is one of 2-order component to 5-order component.

4. The producing method of a high speed FV reducing tire according to claim 1, wherein the high speed FV is a high speed radial FV.

5. The producing method of a high speed FV reducing tire according to claim 1, wherein the high speed FV is a high speed tangential FV.

6. The producing method of a high speed FV reducing tire according to claim 1, wherein the high speed FV n-order is a high speed radial FV 4-order.

7. The producing method of a high speed FV reducing tire according to claim 1, wherein the high speed FV n-order is a high speed tangential FV 2-order.

* * * * *